(12) United States Patent
Berodier et al.

(10) Patent No.: US 10,336,652 B2
(45) Date of Patent: Jul. 2, 2019

(54) ENHANCING CALCINED CLAY USE WITH INORGANIC BINDERS

(71) Applicant: GCP Applied Technologies Inc., Cambridge, MA (US)

(72) Inventors: Elise Berodier, Lausanne (CH); Josephine H. Cheung, Lexington, MA (US); Nathan A. Tregger, Northborough, MA (US)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 15/809,530

(22) Filed: Nov. 10, 2017

(65) Prior Publication Data

US 2019/0144334 A1    May 16, 2019

(51) Int. Cl.
*C04B 14/10*    (2006.01)
*C04B 24/12*    (2006.01)
*C04B 24/28*    (2006.01)
*C04B 28/04*    (2006.01)
*C04B 103/32*   (2006.01)

(52) U.S. Cl.
CPC ............ *C04B 14/10* (2013.01); *C04B 24/122* (2013.01); *C04B 24/283* (2013.01); *C04B 28/04* (2013.01); *C04B 2103/32* (2013.01)

(58) Field of Classification Search
CPC ....... C04B 14/10; C04B 28/04; C04B 24/383; C04B 24/122; C04B 2103/32
See application file for complete search history.

(56) References Cited

U.S. PATENT DOCUMENTS

| | | | |
|---|---|---|---|
| 4,642,137 A | 2/1987 | Heitzmann et al. | |
| 5,626,665 A | 5/1997 | Barger et al. | |
| 6,048,393 A | 4/2000 | Cheung et al. | |
| 8,435,930 B2 * | 5/2013 | Woytowich | C04B 28/02 106/681 |
| 8,906,155 B2 | 12/2014 | Gasafi et al. | |
| 9,212,092 B2 | 12/2015 | Herfort et al. | |

FOREIGN PATENT DOCUMENTS

| | | | |
|---|---|---|---|
| CN | 103613303 A * | 3/2014 | |
| EP | 3109216 | 6/2015 | |
| KR | 101219673 B1 * | 1/2013 | |
| WO | 2016206780 | 6/2016 | |

OTHER PUBLICATIONS

Sabir, B. B., Wild, S., & Bai, J., Metakaolin and calcined clays as pozzolans for concrete: a review. Cement and Concrete Composites, 23(6), 441-454, 2001.

Siddique, R., & Klaus, J., Influence of metakaolin on the properties of mortar and concrete: A review. Applied Clay Science, 43(3), 392-400, 2009.

T. Chappex, K.L. Scrivener, The effect of aluminum in solution on the dissolution of amorphous silica and its relation to cementitious systems, J. Am. Ceram. Soc. 96 (2013) 592-597. doi:10.1111/jace.12098.

L. Nicoleau, E. Schreiner, A. Nonat, Ion-specific effects influencing the dissolution of tricalcium silicate, Cem. Concr. Res. 59 (2014) 118-138. doi:10.1016/j.cemconres.2014.02.006.

Snellings, R., Solution-controlled dissolution of supplementary cementitious material glasses at pH 13: The Effect of Solution Composition on Glass Dissolution Rates. Journal of the American Ceramic Society, 96(8), 2467-2475, 2013.

Kyle Riding, Denise A. Silva, Karen Scrivener, Early Age Strength Enhancement of Blended Cement Systems by CaCl2 and Diethanol-isopropanolamine; Cement and Concrete Research 40 (2010) 935-946, 2010.

* cited by examiner

*Primary Examiner* — Anthony J Green
(74) *Attorney, Agent, or Firm* — Craig K. Leon

(57) ABSTRACT

The present invention discloses cementitious compositions which contain hydratable cement, limestone, or mixture thereof, having improved strength properties due to the presence of calcined clay and certain higher alkanolamines, wherein the calcined clay has an $Fe_2O_3$ content of greater than one percent (1%). Also disclosed are exemplary additives and methods for enhancing strength of cement and/or limestone compositions.

17 Claims, 6 Drawing Sheets

Key

A: Calcined Clay 3

B: Calcined Clay 3 with DEIPA

Key

A: Calcined Clay 3

B: Calcined Clay 3 with DEIPA

Key

A: Calcined Clay 3

B: Calcined Clay 3 with DEIPA

Key

A : Blank sample with Calcined Clay 1

B: DEIPA sample with Calcined Clay 1

C: TEA sample with Calcined Clay 1

D: TIPA sample with Calcined Clay 1

Key

A : Blank sample with Calcined Clay 2

B: DEIPA sample with Calcined Clay 2

Key

A : OPC

B: Limestone Calcined Clay 1 Cement

C: Limestone Calcined Clay 1 Cement and DEIPA

D: Limestone Calcined Clay 1 Cement and TIPA

E: Limestone Calcined Clay 1 Cement and TEA

ENHANCING CALCINED CLAY USE WITH INORGANIC BINDERS

FIELD OF THE INVENTION

The invention relates to the field of construction materials, and more particularly to methods and systems for enhancing the use of calcined clay in hydratable cementitious compositions.

BACKGROUND OF THE INVENTION

It is known to use calcined clay as a clinker substitute for making cement or otherwise combining with cement, which is the binder that holds together aggregates in concrete and mortar compositions. The following patents provide examples.

U.S. Pat. No. 4,642,137 of Heitzmann et al. taught a binder composition that included portland cement in combination with metakaolin and at least one material selected from fly ash, calcined shale, and calcined clay, among other components.

U.S. Pat. No. 5,626,665 of Barger et al. taught cementitious systems comprising gypsum, calcined clay, and clinker consisting essentially of hydratable calcium silicates. The systems of this invention were described as having a water demand of less than about 33% nc (normal consistency); one-day strengths of at least about 1000 psi; and low alkali functionality. By increasing the amount of calcined clay, the resulting cementitious system was believed sequentially to gain alkali non-reactiveness, alkali resistance, and low chloride permeability.

U.S. Pat. No. 8,906,155 of Gasafi et al. taught a method for producing a clinker substitute which included pre-drying clay with an iron content greater than 1.5 wt-% to a moisture level of less than 10 wt-%, comminuting the clay to a grain size of less than 2 mm, calcining it in a furnace at 600-1000° C., and then cooling the resultant material.

U.S. Pat. No. 9,212,092 of Herfort et al. taught a cementitious composition having portland clinker cement and supplementary cementitious material which comprised heat treated clay and optionally heat treated carbonate material. The clay became substantially dehydroxylated while the optionally heat-treated carbonate material remained substantially carbonated; this could be accomplished by premixing the carbonate and clay before heating them to 400-700° C., or by heat-treating the clay separately to a temperature of up to 900° C. When the resultant compositions were used for cementing applications, they were believed to possess higher strengths. See also WO 2016/082936, CA 2968007.

EP3109216 A1 of Dominik Nied et al. taught that certain alkanolamines could accelerate the strength development of hydratable binders which included portland cement and clinker substitute materials including blast furnace slag, lime-rich and lime-fly ash, natural and artificial pozzolanic or latent hydratable glasses, and calcined clay. See e.g., paragraphs [0017] and [0019].

SUMMARY OF THE INVENTION

The present invention arises from the unexpected discovery that certain higher alkanolamines can enhance the pozzolanic reactivity of calcined clay with iron oxide in the form of $Fe_2O_3$. The present inventors were surprised to discover that cementitious compositions which contain hydratable cement, limestone, or mixture thereof, appear to have improved strength properties at both early ages (e.g., 1, 3, and 7 days) and later ages (e.g., 28 day).

The positive effect that the use of a higher alkanolamine such as diethanolisopropanolamine (otherwise known as N,N-bis(2-hydroxyethyl)-2-hydroxypropylamine, or "DEIPA") was found by the present inventors to have on the pozzolanic reactivity of calcined clay would not have been predicted in view, for example, of a study entitled "Early age strength enhancement of blended cement systems by $CaCl_2$ and diethanolisopropanolamine," by Riding et al. in *Cement and Concrete Research*, 2010, which demonstrates that the impact of DEIPA on the pozzolanic reaction is not significant at early ages. This shows that the SCMs are basically inert at this early age.

The present inventors discovered that calcined clay did not need to be used with calcium chloride or other salt in order for its pozzolanic activity, in combination with cement and/or limestone, to be enhanced, but that surprisingly it was required that the calcined clay have at least one percent (1%) content of iron oxide in the form of $Fe_2O_3$. Indeed, this was surprising, given that iron, which imparts a reddish color to clays, usually is considered to reduce the reactivity of clays. For example, the detection of red color will limit the use of a clay in the ceramics and cement industries due to its lower reactivity.

The main components of calcined clay are alumina and silica. It has been previously demonstrated that the presence of alumina decreases the dissolution rate of silica (See e.g., "Solution-controlled dissolution of supplementary cementitious material glasses at pH 13: The effect of solution composition on glass dissolution rates," by Snellings, *Journal of the American Ceramic Society*, 2013; See also "Ion-specific effects influencing the dissolution of tricalcium silicate," Nicoleau et al., *Cement and Concrete Research*, 2014; See also "The Effect of Aluminum in Solution on the Dissolution of Amorphous Silica and its Relation to Cementitious Systems," Chappex et al., *Journal of the American Ceramics Society*, 2013). It was thus believed that the pozzolanic reaction in cementitious materials is limited due to the decreased dissolution rate of silica.

However, the present inventors surprisingly discovered that the dissolution rate of silica is maintained and even increased in the presence of a higher alkanolamine, such as diethanolisopropanolamine (otherwise known as N,N-bis(2-hydroxyethyl)-2-hydroxypropylamine, or "DEIPA"), even with the increase of the alumina concentration.

Thus, an exemplary cementitious composition of the present invention comprises: a hydratable cement, limestone, or mixture thereof, in the amount of 95 to 30% by weight based on the total dry weight of the composition; a calcined clay comprising $Fe_2O_3$ in an amount of 1% to 15% by weight of the calcined clay, the calcined clay being present in the amount of 5% to 70% based on the total dry weight of the cementitious composition; and at least one tertiary alkanolamine in the amount of 0.002% (and more preferably 0.005%) to 0.2% (and more preferably 0.1%) by weight based on the total dry weight of the cementitious composition.

The present invention also provides an additive composition for increasing strength in cementitious compositions containing portland cement, limestone, or mixture thereof. An exemplary additive composition of the invention comprises: calcined clay having $Fe_2O_3$ in an amount of 1%-15% by weight based on the weight of the calcined clay, the calcined clay being present in the amount of 5% to 95% based on the total dry weight of the additive composition; and at least one tertiary alkanolamine chosen from diethanolisopropanolamine, triisopropanolamine, and triethanolamine, or mixture thereof, the amount of the at least one tertiary alkanolamine being present in the amount of 0.002% (and more preferably 0.005%) to 0.2% (and more preferably 0.1%) by weight based on the total weight of the additive composition.

The present invention also provides a method for modifying a cementitious composition comprising introducing to a cement, limestone, or mixture thereof. An exemplary method of the invention for manufacturing cement, limestone, or mixture thereof, comprises: introducing to cement, limestone, or mixture thereof, during grinding, calcined clay having $Fe_2O_3$ in the amount of 1% to 15% by weight based on the weight of the calcined clay, the calcined clay being present in the amount of 5% to 70% based on the weight of cement and limestone; and at least one tertiary alkanolamine chosen from diethanolisopropanolamine, triisopropanolamine, and triethanolamine, or mixture thereof, the amount of the at least one tertiary alkanolamine being present in the amount of 0.002% (and more preferably 0.005%) to 0.2% (and more preferably 0.1%) by weight based on the weight of the cement and limestone.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
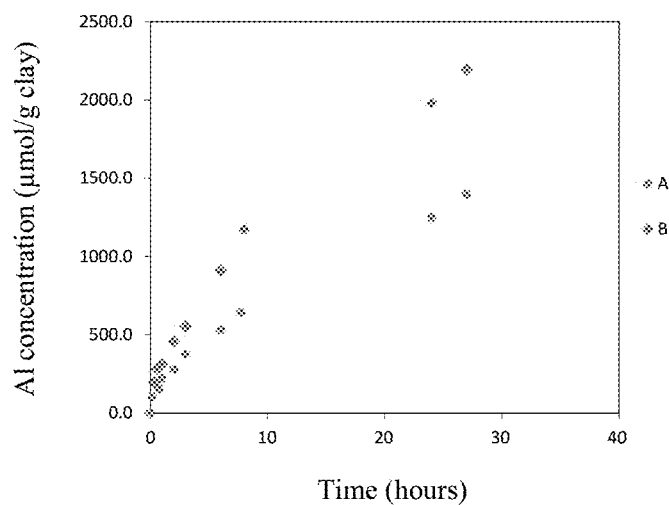
FIGS. 1A, 1B, and 1C are each graphic illustrations of the effect of diethanolisopropaholamine (DEIPA) at 0.02% solids/solids upon the dissolution rates, respectively of alumina, silica and iron for Calcined Clay 3.

A description of example embodiments of the invention follows.

The content of all components in the compositions described below is indicated relative to the dry weight of the composition, unless indicated otherwise.

The conventional cement chemist notation uses the following abbreviations:
$CaO=C$
$SiO_2=S$
$Al_2O_3=A$
$Fe_2O_3=F$ The terms "cement composition" or "cementitious composition" are used herein to designate a binder or an adhesive that includes a material that will solidify upon addition of water (whereby the cementitious material is deemed "hydratable"), and an optional additive. Most cementitious materials are produced by high-temperature processing of calcined lime and a clay. When mixed with water, hydratable cementitious materials form mortar or, mixed with sand, gravel, and water, make concrete. The terms "cementitious material," "cementitious powder," and "cement" may be used herein interchangeably. For purposes of the present invention, Portland cement, limestone, and mixtures thereof, will be considered binder materials.

Cement compositions includes mortar and concrete compositions comprising a hydratable cement. Cement compositions can be mixtures composed of a cementitious material, for example, Portland cement, either alone or in combination with other components such as fly ash, silica fume, blast furnace slag, limestone, natural pozzolans or artificial pozzolans, and water; mortars are pastes additionally including fine aggregate, and concretes are mortars additionally including coarse aggregate. The cement compositions of this invention are formed by mixing certain amounts of required materials, e.g., a hydratable cement, limestone, water, and fine or coarse aggregate, as may be applicable for the particular cement composition being formed.

As used herein, the term "clinker" refers to a material made by heating limestone (calcium carbonate) with other materials (such as clay) to about 1450° C. in a kiln, in a process known as calcination, whereby a molecule of carbon dioxide is liberated from the calcium carbonate to form calcium oxide, or quicklime, which is then blended with the other materials that have been included in the mix to form calcium silicates and other cementitious compounds.

As used herein, the term "Portland cement" include all cementitious compositions which meet either the requirements of the ASTM (as designated by ASTM Specification C150), or the established standards of other countries. Portland cement is prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. Portland cement clinker is formed by the reaction of calcium oxide with acidic components to give, primarily tricalcium silicate, dicalcium silicate, tricalcium aluminate, and a ferrite solid solution phase approximating tetracalcium aluminoferrite.

As used herein, the term "limestone" shall mean and refer to calcium carbonate, and may refer also to non-combustible solids characteristic of sedimentary rocks and composed mainly of calcium carbonate in the form of the mineral calcite. Dolomitic limestone typically refers to limestone containing some impurities, e.g., more than 5% magnesium carbonate. Siliceous limestone typically refers to limestone containing sand or quartz.

As used herein, "alkanolamine" means an alkyl, typically a C1-C6 alkyl, functionalized with at least one amino group and at least one hydroxyl group. Examples of alkanolamines include triethanolamine or TEA, diethanolisopropanolamine or DEIPA, and tri-isopropanolamine or TIPA (typically used as conventional grinding aids in cement production).

As used herein, "clay" is a soil material. There are four main groups of clays: kaolinite, montmorillonite-smectite, illite and chlorite. Kaolinite is known to be the most reactive clay once activated (such as, for example, by calcination).

As used herein, "calcined clay" means a clay thermally activated by heating at a temperature above 650° C. The calcination induces a structural disorder due to the dihydroxylation phenomena. For instance, kaolinite becomes metakaolin after calcination. The clay will preferably contains $Fe_2O_3$ and be calcined in a sufficiently oxygenized environment to form $Fe_{3+}$.

As used herein, pozzolanic activity refers to the ability of a pozzolan material to react via the reaction of aluminosilicate (AS) and calcium hydroxide (CH) in presence of water to form products with binding properties. The reaction can be schematically in cement chemistry notation: AS+CH+H→C—S—H+C-A-H with AS corresponding to the pozzolan and CH to calcium hydroxide. The initiation of the pozzolanic reaction is the dissolution of the silica (S) from the pozzolan, which release silica in the pore solution, which then reacts with calcium hydroxide to form C—S—H.

Various exemplary aspects (embodiments) of the invention are described below.

In a first exemplary aspect, the present invention provides a cementitious composition, which comprises: a hydratable cement, limestone, or mixture thereof in the amount of 95 to 30% by weight based on the total dry weight of the composition; a calcined clay comprising $Fe_2O_3$ in an amount of 1% to 15% by weight of the calcined clay, the calcined clay being present in the amount of 5% to 70% based on the total dry weight of the cementitious composition; and at least one tertiary alkanolamine in the amount of 0.002% (and more preferably 0.005%) to 0.2% (and more preferably 0.1%) by weight based on the total dry weight of the cementitious composition.

In a second aspect based on the first aspect described above, the invention provides an exemplary composition comprising hydratable cement, wherein the ratio of hydratable cement to calcined clay is 2:1 to 1:4 by weight.

In a third aspect based on any of the foregoing first through second exemplary aspects described above, the invention provides a composition comprising hydratable cement, wherein the ratio of hydratable cement to calcined clay is 1:1 to 1:4 by weight.

In a fourth aspect based on any of the foregoing first through third exemplary aspects described above, the invention provides a composition comprising limestone, wherein the ratio of limestone to calcined clay is 3:1 to 1:5 by weight.

In a fifth aspect based on any of the foregoing first through fourth exemplary aspects described above, the invention provides a composition comprising limestone, wherein the ratio of limestone to calcined clay is 2:1 to 1:2 by weight.

In a sixth aspect based on any of the foregoing first through fifth exemplary aspects described above, the invention provides a composition wherein the at least one alkanolamine is chosen from diethanolisopropanolamine (DEIPA), N,N-bis(2-hydroxypropyl)-N-(hydroxyethyl) amine (EDIPA), triisopropanolamine (TIPA), and triethanolamine (TEA), or a mixture thereof.

In a seventh aspect based on any of the foregoing first through sixth exemplary aspects described above, the invention provides a composition wherein the at least one alkanolamine is DEIPA.

In an eighth aspect based on any of the foregoing first through seventh exemplary aspects described above, the invention provides a composition wherein the calcined clay comprises a kaolinite clay in the amount of 30%-100% by total dry weight of the calcined clay.

In an ninth aspect based on any of the foregoing first through eighth exemplary aspects described above, the invention provides a composition wherein the calcined clay comprises a kaolinite clay in the amount of 30%-100% by total dry weight of the calcined clay, and the kaolinite clay is derived from oxisol, ultisol, alfisol, or mixture thereof.

In a tenth aspect based on any of the foregoing first through ninth exemplary aspects described above, the invention provides a composition wherein the calcined clay contains $Fe_2O_3$ in an amount of 1.5% to 8% by weight of the calcined clay.

In an eleventh aspect based on any of the foregoing first through tenth exemplary aspects described above, the invention provides a composition wherein the calcined clay contains $Fe_2O_3$ in an amount of 2.0% to 8% by weight of the calcined clay.

In a twelfth aspect based on any of the foregoing first through eleventh exemplary aspects described above, the composition of the invention further comprises at least one admixture chosen from plasticizers which are otherwise known as water-reducing admixtures (e.g., lignosulfonates, hydroxylated carboxylic acids, polycarboxylate comb polymers, and others); accelerators (e.g., calcium chloride, sodium thiocyanate, calcium formate, calcium nitrate, calcium nitrite, and others); retarders (e.g., sugars, corn syrups, molasses, and others); air entrainers (e.g., salts of wood resin, salts of sulfonated lignin, and others); air detrainers (e.g., tributyl phosphate, tri-iso-butyl phosphate, dibutyl phthalate, octyl alcohol, water-insoluble esters of carbonic and boric acid, and others); shrinkage reducing agents, fibers, cement grinding aids, strength enhancers, or a mixture thereof. Conventional admixtures are contemplated for use within these categories. Explanations of conventional admixtures and examples are found in the patent literature (See e.g., lists of admixtures in U.S. Pat. No. 5,895,116 of Kreinheder et al., owned by the common assignee hereof).

In a thirteenth aspect based on any of the foregoing first through twelfth exemplary aspects described above, the composition of the invention further comprises at least one admixture which is a plasticizing or superplasticizing polycarboxylate comb polymer comprising a backbone structure and (poly) oxyalkylene groups linked by ether moieties to the backbone structure. A preferred polycarboxylate comb polymer containing ether linkages for milling preparation of cementitious materials was taught by Cheung et al. in U.S. Pat. No. 8,993,656 (2015) (owned by the present assignee hereof); and is particularly suitable for use in exemplary compositions made in accordance with the present invention. Cheung et al. taught that such polycarboxylate comb polymers containing a carbon backbone and pendant polyoxyalkene groups with ether (including vinyl ether) linkage groups provided sustained robustness for withstanding the harshness of the grinding mill operation and for conferring workability and strength-enhancing properties.

In a fourteenth exemplary aspect, the invention provides an exemplary additive composition for increasing strength in cementitious compositions that contain portland cement, limestone, or mixture thereof, the additive composition comprising: calcined clay having $Fe_2O_3$ in an amount of 1%-15% by weight based on the weight of the calcined clay, the calcined clay being present in the amount of 5% to 95% based on the total dry weight of the additive composition; and at least one tertiary alkanolamine chosen from diethanolisopropanolamine, triisopropanolamine, and triethanolamine, or mixture thereof, the amount of the at least one tertiary alkanolamine being present in the amount of 0.002% (and more preferably 0.005%) to 0.2% (and more preferably 0.1%) by weight based on the total weight of the additive composition.

In a fifteenth exemplary aspect, which can be based on the fourteenth exemplary aspect described above, the invention provides an additive composition wherein the at least one tertiary alkanolamine is diethanolisopropanolamine.

In a sixteenth exemplary aspect, the invention provides a method comprising introducing to cement, limestone, or mixture thereof, the additive composition in accordance with any of the fourteenth through fifteenth exemplary aspects described above.

In a seventeenth exemplary aspect, the invention provides a method for manufacturing cement, limestone, or mixture thereof, comprising: introducing to cement, limestone, or mixture thereof, during grinding, calcined clay having $Fe_2O_3$ in the amount of 1% to 15% by weight based on the weight of the calcined clay, the calcined clay being present in the amount of 5% to 70% based on the weight of cement and limestone; and at least one tertiary alkanolamine chosen from diethanolisopropanolamine, triisopropanolamine, and triethanolamine, or mixture thereof, the amount of the at least one tertiary alkanolamine being present in the amount of 0.002% (and more preferably 0.005%) to 0.2% (and more preferably 0.1%) by weight based on the weight of the cement and limestone.

In an eighteenth exemplary aspect, based on the seventeenth exemplary aspect described above, the invention provides a method wherein the calcined clay and at least one tertiary alkanolamine are introduced as a premixed additive composition to the cement, limestone, or mixture thereof, during grinding.

In a nineteenth aspect, based on any of the seventeenth through eighteenth exemplary aspects described above, the method further comprising introducing to cement, limestone, or mixture thereof, during grinding, at least one admixture chose from plasticizers (e.g., superplasticizers), accelerators, retarders, air entrainers, air detrainers, shrinkage reducing agents, fibers, grinding aids, strength enhancers, or a mixture thereof.

In a twentieth aspect, based on the a nineteenth exemplary aspect described above, the at least one admixture introduced during grinding to a cement, limestone, or mixture thereof is a plasticizing or superplasticizing polycarboxylate comb polymer comprising a backbone structure and (poly) oxyalkylene groups linked by ether moieties to the backbone structure. Preferably, it is a polycarboxylate ether polymer as previously taught by in Cheung et al. in U.S. Pat. No. 8,993,656 (owned by the common assignee hereof).

While the invention is described herein using a limited number of embodiments, these specific embodiments are not intended to limit the scope of the invention as otherwise described and claimed herein. Modifications and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage dry weight unless otherwise specified (e.g. s/s refers to solids on solids).

EXEMPLIFICATIONS

Example 1: Calcined Clay, Cement and Limestone Characterization

The oxides were measured for each calcined clay, Porland cement and limestone using X-ray fluorescence (XRF). The median particle diameter (Dv,50) was determined using a Malvern Mastersizer 3000 particle size analyzer. In addition, the total alkali equivalent (T-Alk Eq) was calculated. All values are shown in Table 1 below.

TABLE 1

| Oxide | Calcined clay 1 | Calcined clay 2 | Calcined clay 3 | Portland cement | Limestone |
|---|---|---|---|---|---|
| $SiO_2$ | 41.1 | 54.7 | 55.4 | 19.3 | |
| $Al_2O_3$ | 37.1 | 39.8 | 39.3 | 5.70 | |
| $Fe_2O_3$ | 1.39 | 0.52 | 1.63 | 3.60 | |
| CaO | 0.10 | 0.09 | <0.01 | 63.6 | 55.0 |
| MgO | 0.14 | 0.18 | 0.19 | 1.60 | 0.20 |
| $SO_3$ | 0.02 | 0.01 | <0.01 | 3.20 | |
| $Na_2O$ | 0.47 | 0.12 | 0.07 | 0.20 | |
| $K_2O$ | 0.09 | 2.15 | 0.22 | 1.20 | |
| $TiO_2$ | 4.67 | 0.38 | 1.55 | 0.30 | |
| $P_2O_5$ | 0.19 | 0.55 | 0.14 | 0.20 | |
| $Mn_2O_3$ | 0.04 | 0.004 | <0.01 | 0.10 | |
| T-Alk ($Na_2O$ + 0.658 $K_2O$) | 0.53 | 1.53 | 0.22 | | |
| Dv, 50 (um) | 15 | 10 | 12.00 | 9.0 | 8.0 |

Figure 1B:
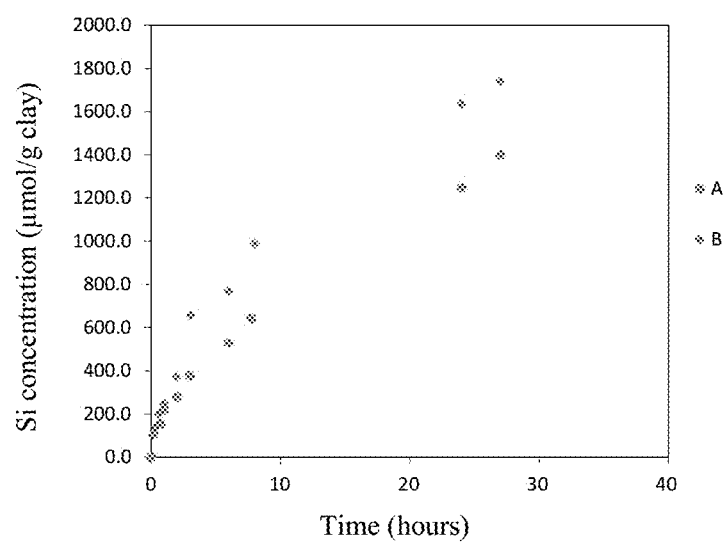
Figure 1C:
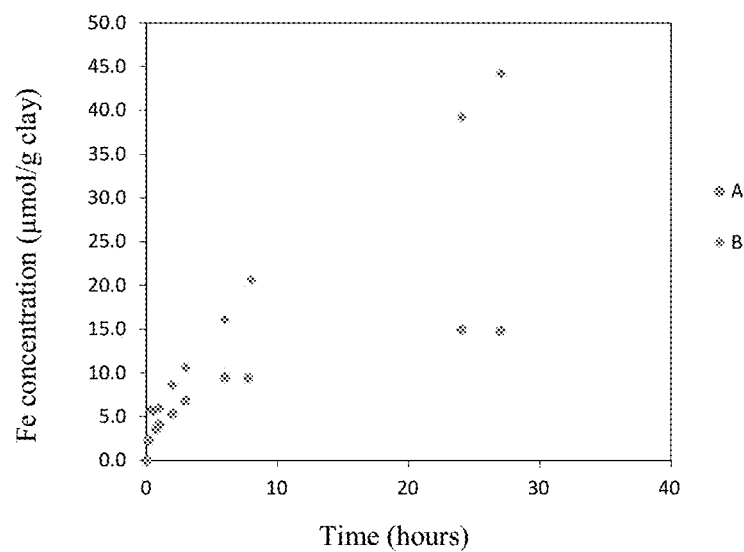

Example 2: Effect of 0.02% s/s DEIPA on the Dissolution Rates of Alumina, Silica and Iron from Calcined Clay Dissolution The dissolution experiment was prepared by filling a plastic container of 250 mL of ultra-pure water created through boiling deionized water to remove any $CO_2$. NaOH was added to increase the alkalinity of the water to obtain a pH of 13, which represents the pH of a typical cement paste pore solution. Approximately 0.25 grams (g) of sieved calcined clay was introduced to the alkaline water in a graduated cylinder. To obtain each sample from the cylinder, 5 mL of the prepared solution was removed from at a consistent height for each sample. The sample was filtered over a 2 micron filter and analyzed by inductively coupled plasma mass spectrometry (ICP). Fresh alkaline solution was added after each sampling in order to maintain a pH of 13. FIGS. 1A, 1B, and 1C illustrate the solution analysis by ICP which demonstrated that the evolution of, respectively, alumina, silica and iron, as released from the calcined clay dissolution experiment over 30 hours. Higher alumina, silica and iron release rates can be observed in the presence of DEIPA in comparison to the control sample, indicating a faster dissolution of the calcined clay with DEIPA. The pozzolanic activity is driven by the silica release rates from the pozzolans. Therefore, a faster release rate and higher amount of silica released indicates a higher pozzolanic activity for the sample with DEIPA. Moreover, as reported in the literature, alumina is known to prevent the dissolution of silica. Here, in these experiments, the results show that silica released is accelerated despite a higher presence of alumina. Therefore, DEIPA surprisingly allows the increase of pozzolanic activity of calcined clay even though the alumina experienced increased released rates. In blended cements containing limestone, extra supply of alumina is necessary for the limestone reaction.

Example 3: $R^3$ Pozzolanic Test of Calcined Clay Containing High Amount of $Fe_2O_3$ The pozzolanic tests were made according to a method developed and described in the paper from Avet et al. in "Development of a new rapid, relevant and reliable ($R^3$) test method to evaluate the pozzolanic reactivity of calcined kaolinitic clays" in *Cement and Concrete Research,* 2016.

Approximately 15.5 g of Calcined Clay 1, 37.5 g of portlandite and 60 g of aqueous solution containing potassium sulfate and potassium hydroxide in the ratio: 0.06 $SO_3$/Calcined Clay 1 and 0.08 $K_2O$/Calcined Clay 1 mass ratios in order to ensure high pozzolanic reactivity were heated up to 40° C. in an oven for at least 8 hours. Three samples containing DEIPA, TIPA or TEA were compared to a blank sample. When noted, 0.02% s/s of DEIPA, TIPA or TEA was added to the aqueous solution. Once the materials reached a stable temperature, they were mixed together for 2 minutes at 1600 revolutions per minute (rpm) with an overhead stirrer. About 10 g of the paste was poured into a glass calorimetry vial. The heat release was recorded for 1 day at 40° C. in a calorimeter (TAM-Air).

Figure 2:
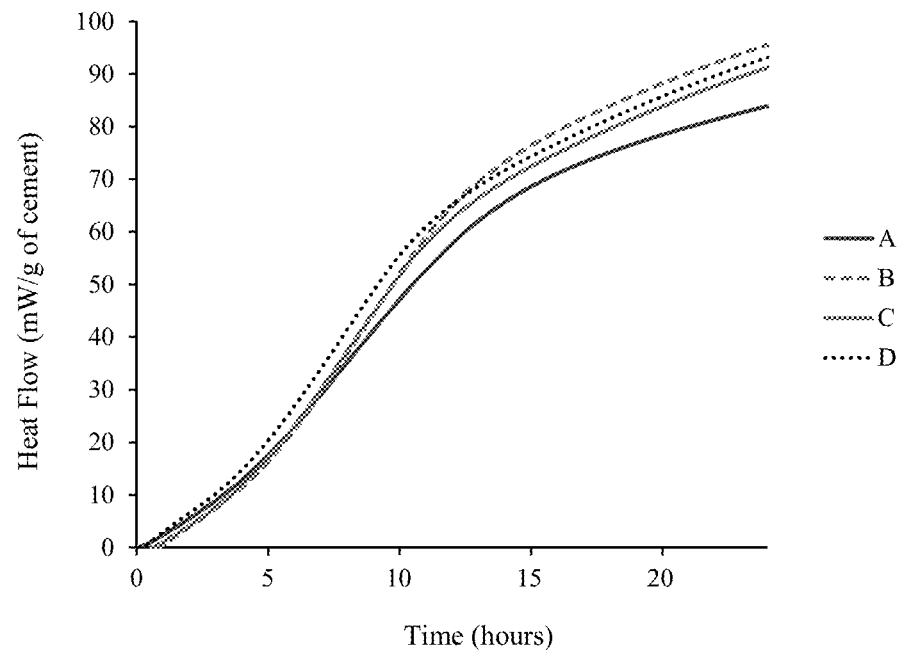
FIG. 2 is a graphic showing the effect of different alkanolamines on the pozzolanic activity for Calcined Clay 1 (containing an $Fe_2O_3$ content >1.0%) based on a R3 pozzolanic test run at 40° C.

The heat released by the mix of portlandite and Calcined Clay 1 with the adjusted alkali amount reflects the pozzolanic activity of the calcined clay. FIG. 2 illustrates the cumulative heat evolution of the samples at 40° C. for 24 hours. The curves containing alkanolamines (DEIPA, TEA, TIPA) correspond to greater cumulative heat generated over time, and thus these curves are seen higher compared to the "blank" curve. This indicates that the reaction between the calcined clay and portlandite is activated by the presence of alkanolamines, and provides extra heat from the calcined clay dissolution. The order of activation ability is DEIPA>TIPA>TEA.

Figure 3:
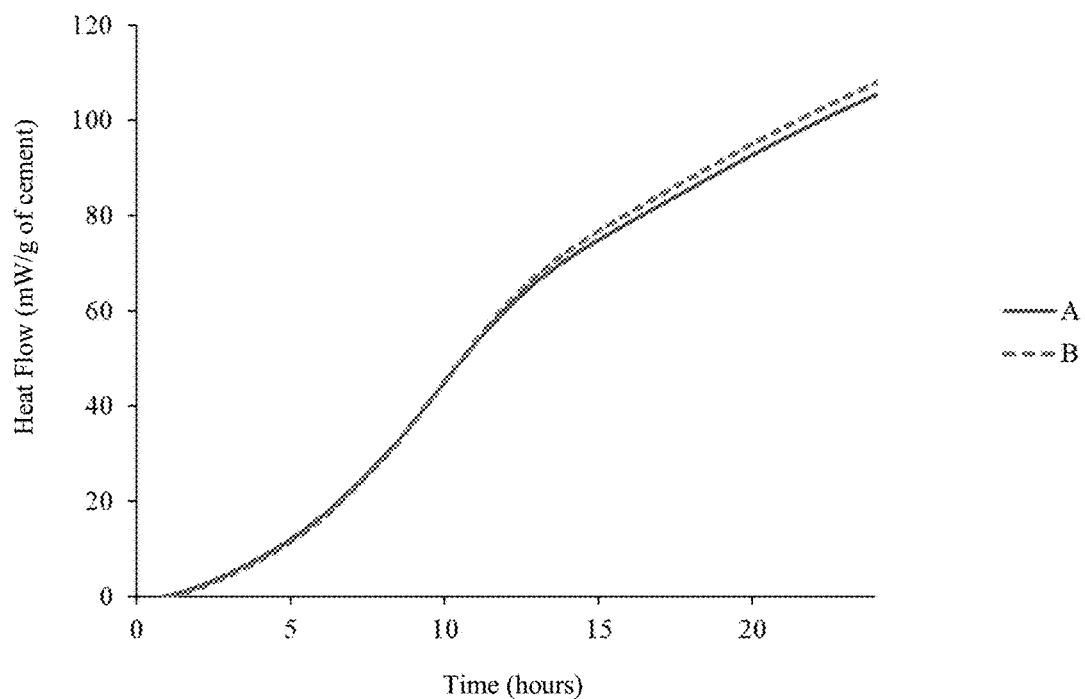
FIG. 3 is a graphic illustration of the the effect of DIEPA on the pozzolanic activity for Calcined Clay 2 (containing an $Fe_2O_3$ content <1.0%) based on a R3 pozzolanic test run at 40° C.

Example 4: $R^3$ Pozzolanic Test of Calcined Clay Containing High Amount of $Fe_2O_3$ A similar set of tests as described in Example 3 was performed with Calcined Clay 2. The main difference between Calcined Clay 1 and Calcined Clay 2 is their level of $Fe_2O_3$. Calcined Clay 2 contains a lower amount of $Fe_2O_3$ in terms of its composition level (See Example 1). FIG. 3 illustrates that the heat released in this case is not as significantly affected by the presence of DEIPA as in Example 3. This indicates a lower effect of the chemical on calcined clay containing a lower amount of $Fe_2O_3$. Therefore, the present inventors believe that DEIPA is more efficient in activating the pozzolanic reaction of calcined clay when the calcined clay contains a larger amount of $Fe_2O_3$. This is of great interest as it can be seen that calcined clays with high levels of $Fe_2O_3$ are available widely but less reactive than purer calcined clay (i.e., having lower amounts of $Fe_2O_3$). Therefore, DEIPA, TIPA and TEA can be used to extend significantly one's use of calcined clays to include those which are usually considered less pure containing $Fe_2O_3$.

Example 4: Compressive Strength Test

Figure 4:
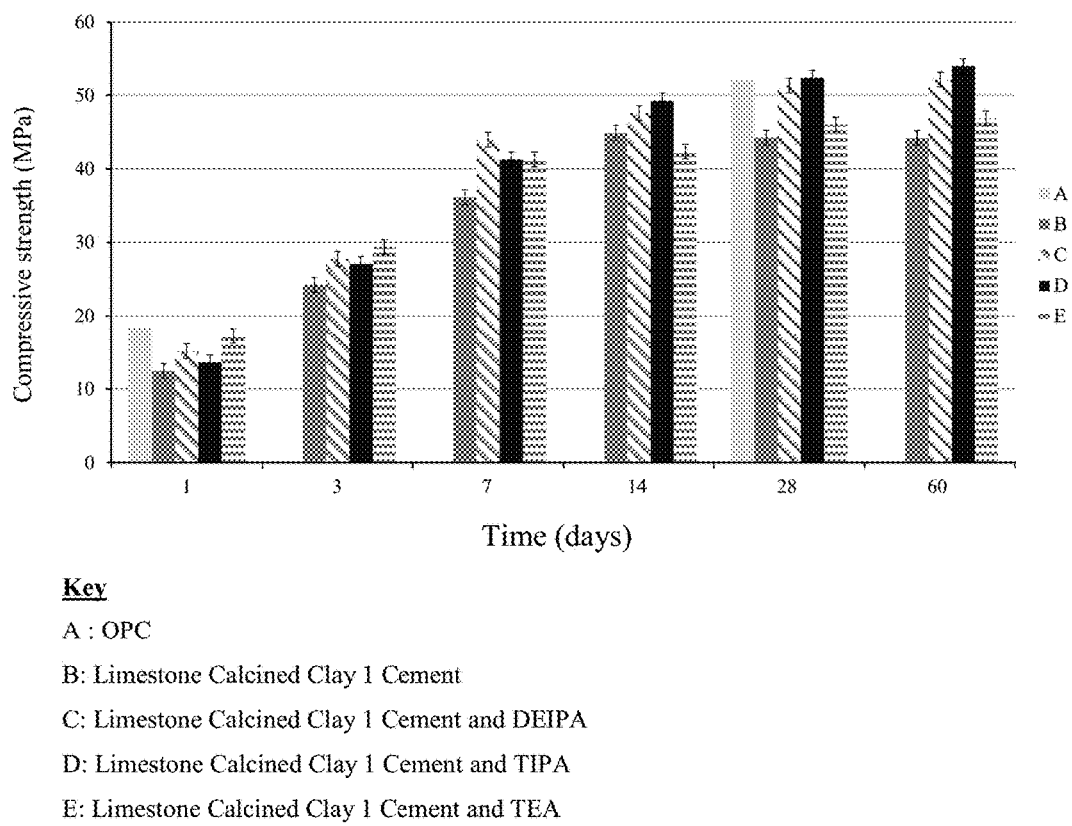
FIG. 4 is a bar plot comparing the compressive strength from 1 to 60 days of portland cement, portland cement with Limestone and Calcined Clay (LCC) and portland cement with LCC and three different alkanolamines at a 0.02% s/s dose.

The compressive strengths of both plain Portland cement and Limestone Calcined Clay Cements (LC3) were compared to LC3 containing 0.02% s/s of either DEIPA or TIPA or TEA. Mortar prisms were made according to EN-196-1:2016. From FIG. 4, it can be seen that mortar containing one of the alkanolamines have higher strength than the blank LC3 at all ages. LC3 with TEA presented the highest earlier strength until 3 days. At longer ages, TIPA was more efficient on the strength. It can be observed that, after 14 days, the compressive strength of the LC3 blank was not dramatically increased; whereas, with DEIPA and TIPA, the strength increase continued even after 28 days. Overall, in this example, DEIPA provides the better option to overcome limited early strength and stabilized later strength in LC3. Most importantly, it was surprising to note that DEIPA and TIPA were able to increase the strength to be comparable to the plain Portland cement sample at 28 days, thus providing a true cement placement without loss of strength.

While this invention has been particularly shown and described with references to example embodiments thereof, it will be understood by those skilled in the art that various changes in form and details may be made therein without departing from the scope of the invention encompassed by the appended claims.

We claim:

1. A cementitious composition, comprising:
   a hydratable cement, limestone, or mixture thereof in the amount of 95 to 30% by weight based on the total dry weight of the composition;
   a calcined clay comprising $Fe_2O_3$ in an amount of 1% to 15% by weight of the calcined clay, the calcined clay being present in the amount of 5% to 70% based on the total dry weight of the cementitious composition; and
   at least one tertiary alkanolamine comprising diethanolisopropanolamine (DEIPA) in the amount of 0.002% to 0.2% by weight based on the total dry weight of the cementitious composition.

2. The composition of claim 1 comprising limestone, wherein the ratio of limestone to calcined clay is 2:1 to 1:2 by weight.

3. The composition of claim 1 further comprising an alkanolamine chosen from N,N-bis(2-hydroxypropyl)-N-(hydroxyethyl)amine (EDIPA), triisopropanolamine (TIPA), triethanolamine (TEA), or a mixture thereof.

4. The composition of claim 1 wherein the calcined clay comprises a kaolinite clay in the amount of 30%-100% by total dry weight of the calcined clay.

5. The composition of claim 4 wherein the kaolinite clay is derived from oxisol, ultisol, alfisol, or mixture thereof.

6. The composition of claim 1 wherein the calcined clay contains $Fe_2O_3$ in an amount of 1.5% to 8% by weight of the calcined clay.

7. The composition of claim 1 wherein the calcined clay contains $Fe_2O_3$ in an amount of 2.0% to 8% by weight of the calcined clay.

8. The composition of claim 1 further comprising at least one admixture chosen from plasticizers, accelerators, retarders, air entrainers, air detrainers, shrinkage reducing agents, fibers, grinding aids, strength enhancers, or a mixture thereof.

9. The composition of claim 8 wherein the at least one admixture is a plasticizing or superplasticizing polycarboxylate comb polymer comprising a backbone structure and (poly)oxyalkylene groups linked by ether moieties to the backbone structure.

10. An additive composition for increasing strength in cementitious compositions that contain portland cement, limestone, or mixture thereof, the additive composition comprising:
    calcined clay having $Fe_2O_3$ in an amount of 1%-15% by weight based on the weight of the calcined clay, the calcined clay being present in the amount of 5% to 95% based on the total dry weight of the additive composition; and
    at least one tertiary alkanolamine comprising diethanolisopropanolamine (DEIPA), the amount of the at least one tertiary alkanolamine being present in the amount of 0.002% to 0.2% by weight based on the total weight of the additive composition.

11. A method comprising: introducing to cement, limestone, or mixture thereof, the additive composition of claim 10.

12. A method for manufacturing cement, limestone, or mixture thereof, comprising:
introducing to cement, limestone, or mixture thereof, during grinding,
calcined clay having $Fe_2O_3$ in the amount of 1% to 15% by weight based on the weight of the calcined clay, the calcined clay being present in the amount of 5% to 70% based on the weight of cement and limestone;
at least one tertiary alkanolamine chosen from diethanolisopropanolamine (DEIPA), -N,N-bis(2-hydroxypropyl)-N-(hydroxyethyl)amine (EDIPA), triisopropanolamine, triethanolamine, or mixture thereof, the amount of the at least one tertiary alkanolamine being present in the amount of 0.002% to 0.2% by weight based on the weight of the cement and limestone; and
a plasticizing or superplasticizing polycarboxylate comb polymer having a backbone structure and (poly) oxyalkylene groups linked by ether moieties to the backbone structure.

13. The method of claim 12 wherein the calcined clay, the at least one tertiary alkanolamine, and the plasticizing or superplasticizing polycarboxylate comb polymer are introduced as a premixed additive composition.

14. The method of claim 12 further comprising introducing to cement, limestone, or mixture thereof, during grinding, at least one admixture chosen from accelerators, retarders, air entrainers, air detrainers, shrinkage reducing agents, fibers, grinding aids, strength enhancers, or a mixture thereof.

15. A cementitious composition, comprising:
a hydratable cement, limestone, or mixture thereof in the amount of 95 to 30% by weight based on the total dry weight of the composition;
a calcined clay comprising $Fe_2O_3$ in an amount of 1% to 15% by weight of the calcined clay, the calcined clay being present in the amount of 5% to 70% based on the total dry weight of the cementitious composition; and
at least one tertiary alkanolamine in the amount of 0.002% to 0.2% by weight based on the total dry weight of the cementitious composition, the at least one tertiary alkanolamine comprising diethanolisopropanolamine (DEIPA), -N,N-bis(2-hydroxypropyl)-N-(hydroxyethyl)amine (EDIPA), or mixture of DEIPA and EDIPA.

16. A composition, comprising:
limestone in the amount of 95 to 30% by weight based on the total dry weight of the composition;
a calcined clay comprising $Fe_2O_3$ in an amount of 1% to 15% by weight of the calcined clay, the calcined clay being present in the amount of 5% to 70% based on the total dry weight of the composition; and
at least one tertiary alkanolamine in the amount of 0.002% to 0.2% by weight based on the total dry weight of the composition;
wherein the ratio of limestone to calcined clay is 2:1 to 1:2 by weight.

17. A cementitious composition, comprising:
a hydratable cement, limestone, or mixture thereof in the amount of 95 to 30% by weight based on the total dry weight of the composition;
a calcined clay comprising $Fe_2O_3$ in an amount of 1% to 15% by weight of the calcined clay, the calcined clay being present in the amount of 5% to 70% based on the total dry weight of the cementitious composition;
at least one tertiary alkanolamine in the amount of 0.002% to 0.2% by weight based on the total dry weight of the cementitious composition; and
at least one admixture comprising a plasticizing or superplasticizing polycarboxylate comb polymer having a backbone structure and (poly)oxyalkylene groups linked by ether moieties to the backbone structure.

* * * * *